United States Patent

[11] 3,627,062

[72] Inventor Theron W. Jenkins, Jr.
Ambler, Pa.
[21] Appl. No. 48,585
[22] Filed June 1, 1970
[45] Patented Dec. 14, 1971
[73] Assignee Leeds & Northrup Company
Philadelphia, Pa.

[54] HEAT DISTRIBUTION CONTROL IN ONCE-THROUGH BOILERS
12 Claims, 2 Drawing Figs.
[52] U.S. Cl........................................ 122/479 R,
122/479 A, 122/479 S
[51] Int. Cl........................................ F22g 5/06
[50] Field of Search.......................... 122/406 S,
448 S, 479, 479 S

[56] References Cited
UNITED STATES PATENTS
3,186,175 6/1965 Strohmeyer, Jr. ............ 122/479 X
3,202,136 8/1965 Hottenstine................. 122/479 X
3,155,079 11/1964 Clayton, Jr. ................. 122/479 X
2,966,896 1/1961 Vogler......................... 122/479 X Primary Examiner—Kenneth W. Sprague
Attorneys—William G. Miller, Jr. and Raymond F. MacKay ABSTRACT: The reheater outlet temperature of a once-through boiler is controlled by adjustment of a manipulated variable which modifies the heat distribution in the boiler. By using only a small amount of proportional and rate response to the reheater outlet temperature deviations, the response of the control may be made relatively insensitive to transient disturbances for causes which do not change the heat distribution. A significant proportional and rate response is provided from an index of the heat distribution and that response is added to the control response from the reheater temperature deviation to provide an effective control of those disturbances which do affect the heat distribution. The index is calculated as the difference between the reheater outlet temperature and the average of the superheater outlet temperature and the waterwall outlet temperature.

Patented Dec. 14, 1971

3,627,062

INVENTOR:
THERON W. JENKINS, JR.

BY William G. Miller Jr.

AGENT

HEAT DISTRIBUTION CONTROL IN ONCE-THROUGH BOILERS

BACKGROUND OF THE INVENTION

This invention relates to the control of the distribution of heat in a once-through boiler to maintain the reheater outlet temperature at the desired value. More particularly, this invention relates to a control of the reheater outlet temperature so that the control is relatively insensitive to disturbances which do not change the heat distribution in the boiler.

In the past, control of the reheater outlet temperature has been provided by regulating heat distribution by proportional, rate and reset control action based on the reheater outlet temperature deviation. With such a control system the control action was the same for a reheater outlet temperature change caused by a heat distribution disturbance as for a change caused by certain disturbances which did not directly affect the heat distribution, such as a change in the firing rate/feedwater ratio. Regulation of the heat distribution when made in response to changes in the firing rate/feedwater ratio has been found to be undesirable, for that ratio is normally corrected by a separate control loop which also tends to correct the reheater outlet temperature.

It is therefore an object of this invention to provide a method and means to detect changes in heat distribution, and to provide significant corrective action when such changes are detected with relatively little corrective action being taken in response to reheater outlet temperature changes resulting from disturbances other than those directly affecting the heat distribution.

In carrying out the invention there is provided apparatus for executing the following steps of the method for controlling the reheater outlet temperature. There is first an automatic comparison of the reheater outlet temperature and a preset desired value for that temperature. This comparison is followed by a change in the distribution of heat in the boiler in response to the deviation determined by that comparison so as to tend to maintain the reheater outlet temperature at its desired value. Measurement is made of the values of separate quantities such as the waterwall outlet temperature and the superheater outlet temperature which are indicative respectively of the enthalpy increase in each of the sections of the primary fluid path and a quantity such as reheater outlet temperature which is indicative of the enthalpy increase in the reheater. Then there is an automatic modification of the heat distribution in proportion to changes in the normal relationship between changes in the enthalpy increase in the reheater as compared with relative changes in the enthalpy increase in each of the respective sections of the primary fluid path as determined from the measured values of the separate quantities.

DESCRIPTION OF THE PREFERRED EMBODIMENTS

Figure 1:
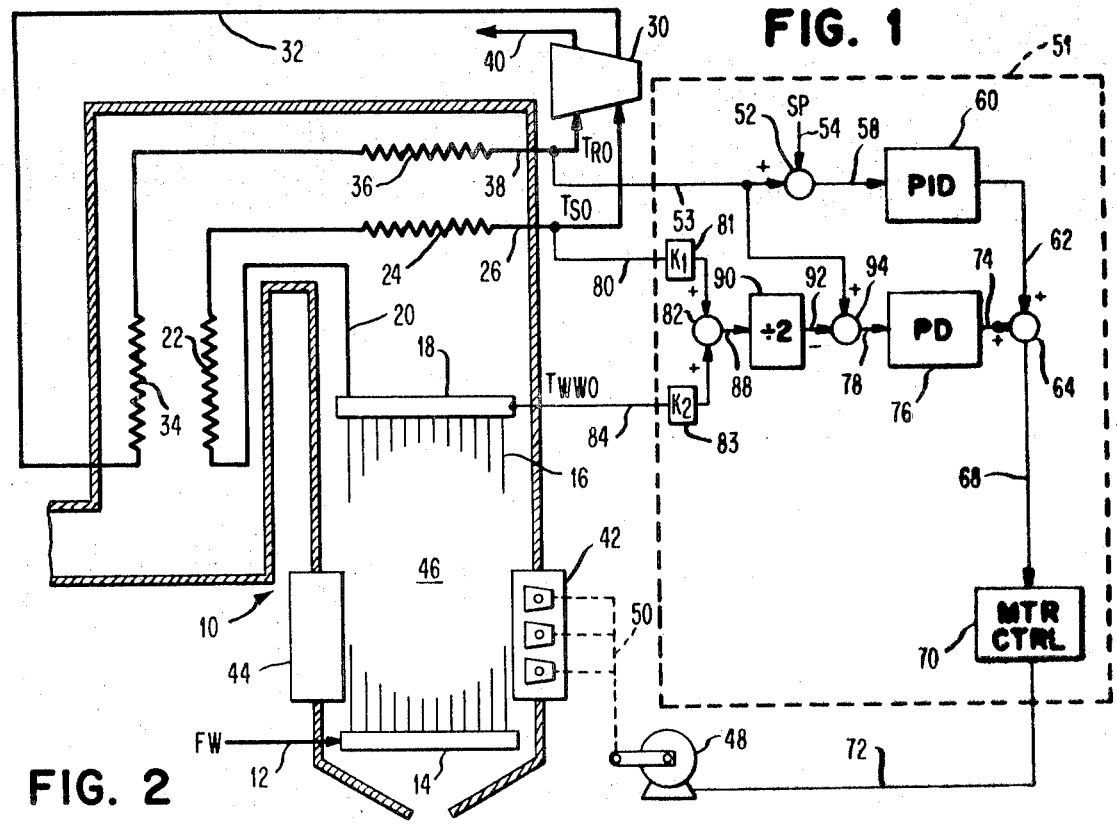
FIG. 1 is a diagram showing one form of the novel control system as applied to the adjustment of tilting burners.

In FIG. 1 the boiler 10 is shown as a once-through boiler in which the feedwater is supplied through line 12 to a manifold 14 at the bottom of waterwall 16. The waterwall is shown as comprising a large number of fluid conducting tubes which connect from the manifold 14 to the upper manifold 18. From the upper manifold the heated fluid is conducted by piping represented by line 20 to the primary superheater section 22 and then to the final superheater section 24. The waterwall and the primary and secondary superheater thus form separate sections of the primary fluid path in the boiler. In each of those sections there is an increase in the enthalpy of the fluid passing through those sections as a result of the heat input to the boiler.

From section 24 the superheater outlet line 26 delivers the superheated steam to the high pressure section of the turbine 30. From the initial section of the turbine 30 steam is carried by line 32 to the reheater of the boiler. The reheater includes a primary reheater section 34 and a final reheater section 36. From section 36 the fluid is conducted by way of piping from the reheater outlet 38 to the low-pressure section of turbine 30. The steam of the low-pressure section of turbine 30 is then conducted by way of line 40 to a condenser (not shown).

In FIG. 1 the boiler is shown as a once-through boiler heated by the flames from a group of tilting burners 42 and 44. As shown in FIG. 1, the angle of the burners 42 with respect to the furnace chamber 46 of the boiler 10 is automatically adjusted by the control motor 48 through the mechanical linkage 50. The burners 44 are simultaneously adjusted so that the center of the flame produced by the burners 42 and 44 is automatically altered in its position between a lower level in the furnace 46 and a higher level. As a result of such an adjustment there is an alteration in the distribution of heat in the boiler. That alteration is in a sense to increase the heat available for absorption by the superheater and reheater sections as compared with that available for absorption by the waterwall when the adjustment is to a higher level. Similarly, the adjustment of the burners in a reversed direction, namely to a lower level in the furnace, alters the distribution of heat in an opposite sense so that there is an increase in the heat absorbed by the waterwall accompanied by a decrease in the heat absorbed by the superheater and reheater sections.

In the normal once-through type boiler the disturbances which affect the reheater outlet temperature $T_{RO}$ may be changes which result from the operation of control systems maintaining other boiler conditions, such as the boiler output. For example, changes may be made in the firing rate, the feedwater flow rate or the relationship between the firing rate and the feedwater flow rate for the purpose of controlling conditions other than reheater outlet temperature. Such changes generally affect both the reheater outlet temperature $T_{RO}$ and the temperature at the superheater outlet $T_{SO}$ as well as the intermediate temperatures in the primary fluid path such as the temperature at the waterwall outlet $T_{WWO}$. Such changes however do not usually affect the heat distribution in the boiler to a significant degree and therefore any significant proportional and/or rate control action to change the heat distribution is response to the reheater outlet temperature deviations should be relatively small.

Thus the control of the heat distribution from the reheater outlet temperature deviation is preferably by a control response which is predominantly a reset response with very little proportional or rate control response. In order to provide the desired close control of the reheater outlet temperature during transient conditions in the boiler a proportional and rate response to changes in the heat distribution in the boiler is added to the control response from the reheater outlet temperature deviation.

In order to provide the proportional and rate response in accordance with changes in the heat distribution it is necessary to obtain an indication of the changes in the heat distribution. It has been found that a good index of the heat distribution in the boiler is provided by calculating the difference between the reheater outlet temperature and the average of the superheater outlet temperature and the waterwall outlet temperature. The added proportional and rate action is then provided in response to the magnitude of that index, and as a result the regulation of heat distribution to control the reheater outlet temperature is maintained substantially stable under transient boiler conditions including those which do not affect the heat distribution in the boiler.

The index of the heat distribution mentioned above will, of course, provide an indication of a change in the heat distribution whether it be an inadvertent change as might result from the falling of slag from the waterwall of the boiler or a deliberate change in the heat distribution as might occur in response to control action.

As shown in FIG. 1, the temperature of the reheater outlet $T_{RO}$ is measured at outlet 38. This measurement may be made by means of a thermocouple producing a signal representing the temperature of the steam at the reheater outlet. The signal is transmitted by electrical conductors which are represented in FIG. 1 by the light line 53 to the summing junction 52 of the control system 51. The junction 52 represents a comparator capable of comparing the setpoint established as a signal on line 54 in accordance with the desired reheater outlet temperature and the signal on line 53. The comparator 52 then provides an output signal on line 58 which is representative of the deviation of the reheater outlet temperature from its desired value.

The signal on line 58 is then utilized as an input to controller 60. Controller 60 is shown as providing proportional, integral and derivative action as indicated by the use of "PID" as identifying nomenclature. The proportional, integral and derivative action of controller 60 corresponds respectively to the proportional, reset and rate action which are the common control responses which are provided by most industrial controllers.

In this system the controller 60 is advantageously tuned to provide only a small amount of proportional and rate action compared with the amount of reset action. The signal on line 62 as provided by controller 60 represents the desired position for control motor 48 in order to establish the desired reheater outlet temperature $T_{RO}$. The signal on line 62 is transmitted by way of the summing junction 64 to line 68 which provides an input to motor controller 70. The motor controller 70 then produces on its output lines 72 a signal to control the motor 48 which is operative to adjust the tilt of the burners 42 in response to the signal appearing on line 62.

There is provided on line 74 at the other input to the summer which is represented by the summing junction 64 a signal for modifying the burner tilt adjustment established by motor 48 by modifying the signal on line 62 in accordance with a proportional and derivative (rate) response to the signal on line 78 which is representative of the computed quantity which is an index of the heat distribution in the boiler, namely the difference between the reheater outlet temperature and the average of the superheater outlet temperature and the waterwall outlet temperature. Thus the signal on line 72 represents the sum of the outputs of the controllers 76 and 60.

The heat distribution index signal appearing on line 78 as an input to controller 76 is produced by measuring the temperature of the steam at the superheater outlet 26 and representing that temperature as a signal on line 80 to provide one of the inputs to the summing junction 82 after it has been multiplied by the constant $K_1$ in multiplier 81. The summing junction 82 diagrammatically represents a summer capable of producing on its output line 88 a signal which responds also to the signal on line 84 as modified by a multiplication by the constant $K_2$ in multiplier 83. The signal on line 84 as shown in FIG. 1 is a measure of the temperature at the waterwall outlet $T_{WWO}$.

In a normal system, the superheater outlet temperature and the waterwall outlet temperature can both be measured by thermocouples and the signals from those thermocouples after being multiplied by $K_1$ and $K_2$ can be summed to provide a composite signal on line 88. That composite signal is then divided by 2 so as to provide as an output from the divider 90 a signal on line 92 indicative of a weighted average of the superheater outlet temperature and the waterwall outlet temperature.

By means of the comparator 94, shown diagrammatically as a summing junction, the reheater outlet temperature represented by the signal on line 50 is compared with the weighted average of the temperatures at the superheater outlet and the waterwall outlet as represented by the signal on line 92. Thus there is provided as an output of the comparator 94 on line 78 a heat distribution index signal which is utilized as an input to the controller 76.

The heat distribution index can be represented by the equation $T_{RO}-(K_1T_{SO}+K_2T_{WWO})/2$ in which $K_1$ and $K_2$ may typically be constants having a nominal value of 1.0. However, depending on the boiler configuration and the location of the temperature measuring thermocouples for obtaining the superheater outlet temperature and the waterwall outlet temperature $K_1$ and $K_2$ may have other values as may be necessary to make the heat distribution index substantially immune to disturbances such as changes in firing rates, feedwater flow or the ratio of those two quantities.

In summary, the control of the tilting burners 42 and 44 is normally carried out so as to maintain the temperature of the reheater outlet steam at its desired value through the action of the controller, which is primarily reset action, and the motor controller 70. However, the tilt of the burners 42 and 44 is adjusted by supplementary control based on the proportional and derivative response of the controller 76 from the heat distribution index signal appearing on line 78. Such changes in the tilt of the burners 42 and 44 modify the heat distribution by changing the relationship between the change in the enthalpy increase in the reheater as compared with the relative change in the enthalpy increase in each of the sections of the primary fluid path, namely the waterwall sections of the superheater section. The enthalpy increase in the reheater is, of course, represented by the reheater outlet temperature $T_{RO}$ and the enthalpy increase in the respective sections of the primary fluid path are represented by the temperature measurements $T_{WWO}$ for the waterwall and $T_{SO}$ for the superheater section.

Figure 2:
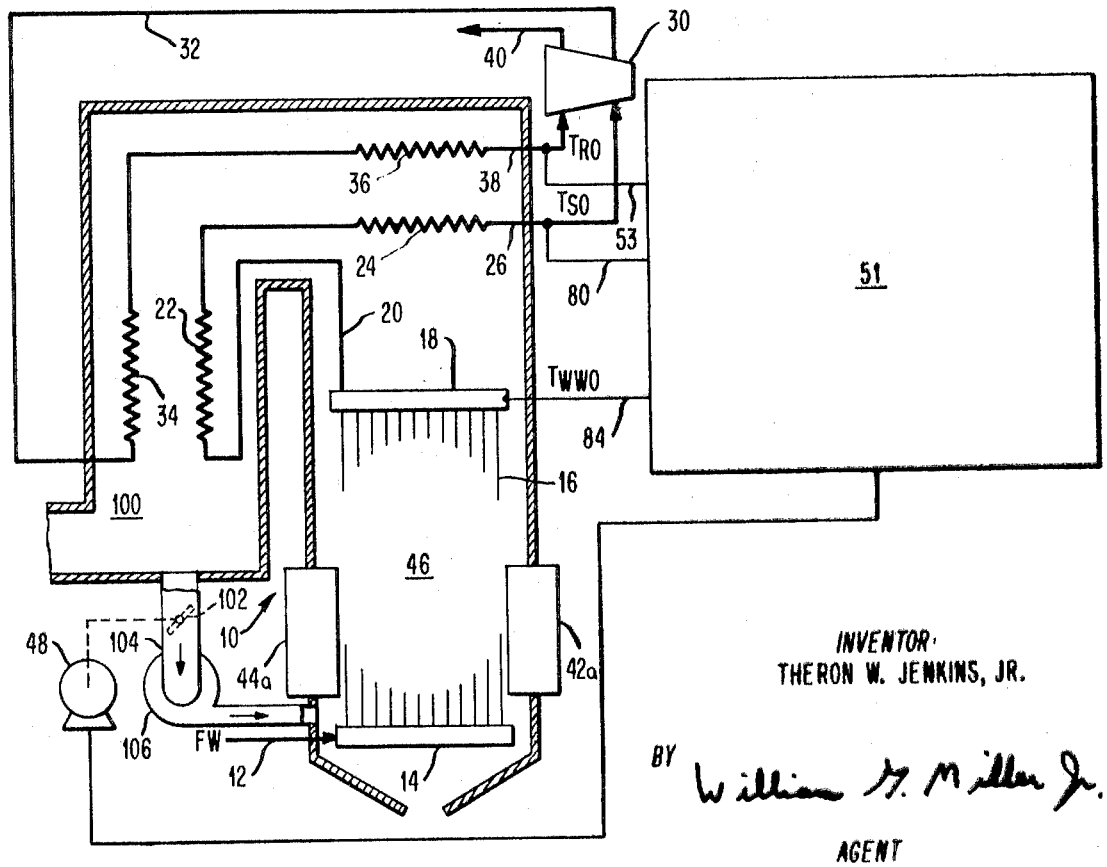
FIG. 2 is a diagram showing the use of a similar control system for the control of recirculated gas.

In FIG. 2, where similar elements are identified by similar reference characters, the output of the control system 51 is effective to modify the position of the control motor 48 in the same manner as described in FIG. 1. However, in FIG. 2 the control motor 48 is effective to adjust the heat distribution in the boiler 10 by modifying the amount of gas recirculated from the offtake 100. The adjustment of the volume of the circulated gas is accomplished by the adjustment of the damper 102 in the recirculating gas line 104. The recirculating gas line 104 includes the recirculating fan 106 which forces the gases from he offtake to the lower portion of the boiler in furnace 46 to thereby modify the distribution of the heat within the boiler. There is no need for a tilting of the burners in FIG. 2, hence the burners identified as burners 42a and 44a may be fixed burners.

Still another method for modifying the distribution other than by the adjustment of the burner tilt as shown in FIG. 1 or the modification of the volume of recirculated gas as shown in FIG. 2 may be utilized with a control system of the type shown as 51 in FIG. 1. Similarly, the heat distribution index signal may be modified. For example, a temperature other than the waterwall outlet temperature may be utilized in the calculation of the heat distribution index. It is only necessary that the temperature utilized should be a temperature intermediate between the superheater outlet and the feedwater inlet.

What is claimed is:

1. A method for automatically controlling the reheater outlet temperature of a once-through boiler comprising the steps of automatically comparing the reheater outlet temperature with a preset desired value, automatically controlling the distribution of heat in the boiler in response to the integral of the deviation determined by said comparison so as to tend to maintain said reheater outlet temperature at its desired value, measuring the heat distribution between the sections of the primary fluid path and the reheater, and automatically modifying said control of the heat distribution by a proportional and rate action in response to the measured heat distribution.

2. A method for automatically controlling the reheater outlet temperature of a once-through boiler comprising the steps of automatically comparing the reheater outlet temperature with a preset desired value for the reheater outlet temperature, automatically changing the distribution of heat in the boiler in response to the deviation determined by said comparison so as to tend to maintain said reheater outlet temperature at its desired value, measuring the values of separate quantities indicative of the enthalpy increase in each of the sections of the primary fluid path and the enthalpy increase in the reheater, and automatically modifying said heat distribution in proportion to changes in the normal relationship between changes in the enthalpy increase in the reheater as compared with relative change in the enthalpy increase in each of the respective sections of the primary fluid path as determined from the measured values of said separate quantities.

3. The method of claim 2 in which the separate quantities indicative of the enthalpy increase in each of the sections of the primary fluid path are the temperature of the steam at the outlet of the superheater and the temperature of the heated fluid measured in the primary path at a point intermediate between the superheater outlet and the feedwater inlet.

4. The method of claim 3 in which the point intermediate between the superheater outlet and the feedwater inlet is the waterwall outlet.

5. The method of claim 3 in which the separate quantity indicative of the enthalpy increase in the reheater is the temperature of the steam at the reheater outlet.

6. The method of claim 2 in which the modification of the heat distribution is carried out by adjusting the burner tilt.

7. The method of claim 2 in which the modification of the heat distribution is carried out by adjusting the amount of gas recirculated.

8. A method for automatically controlling the reheater outlet temperature of a once-through boiler comprising the steps of automatically comparing the reheater outlet temperature with a preset desired value, automatically controlling the distribution of heat in the boiler in response to the integral of the deviation determined by said comparison so as to tend to maintain said reheater outlet temperature at its desired value, measuring the values of separate quantities indicative of the enthalpy increase in each of the sections of the primary fluid path and the enthalpy increase in the reheater, and automatically modifying said control of the heat distribution by a proportional and rate action in response to the change in the normal relationship between changes in the enthalpy increase in the reheater as compared with relative changes in the enthalpy increase in each of the respective sections of the primary fluid path as determined from the measured values of said separate quantities.

9. A method as set forth in claim 8 in which the separate quantities indicative of the enthalpy increase in each of the sections of the primary fluid path are the temperature of the steam at the outlet of the superheater and the temperature of the heated fluid measured in the primary path at a point intermediate between the superheater outlet and the feedwater inlet and the separate quantity indicative of the enthalpy increase in the reheater is the temperature of the steam at the reheater outlet.

10. A system for controlling the reheater outlet temperature of a once-through boiler comprising means for automatically comparing the reheater outlet temperature with a preset desired value for the reheater outlet temperature, means for automatically changing the distribution of heat in the boiler in response to the deviation determined by said comparison so as to tend to maintain said reheater outlet temperature at its desired value, means for measuring the values of separate quantities indicative of the enthalpy increase in each of the sections of the primary fluid path and the enthalpy increase in the reheater, and means for automatically modifying said heat distribution in proportion to changes in the normal relationship between changes in the enthalpy increase in the reheater as compared with relative change in the enthalpy increase in each of the respective sections of the primary fluid path as determined from the measured values of said separate quantities.

11. A method for automatically controlling the reheater outlet temperature of a once-through boiler comprising the steps of automatically comparing the reheater outlet temperature with a preset desired value, automatically controlling the distribution of heat in the boiler in response to the integral of the deviation determined by said comparison so as to tend to maintain said reheater outlet temperature at its desired value, measuring the values of separate quantities which have a relationship indicative of the heat distribution in the boiler, and automatically modifying said control of the heat distribution by a proportional and rate action in response to a change in said relationship indicative of a change in the heat distribution.

12. A system for automatically controlling the fluid temperature at the reheater outlet of a once-through boiler comprising first means for measuring the fluid temperature at the reheater outlet, second means for measuring the fluid temperature at the superheater outlet, third means for measuring the fluid temperature at the waterwall outlet, fourth means for comparing the temperature measured by said first means with a preset desired value for that temperature, fifth means for comparing the temperatures as measured by said first means with the average of the temperature measured by said second and third means, and sixth means for automatically controlling the distribution of heat in the boiler in response to values determined by the comparisons made by said fourth and fifth means, said automatic control providing its significant reset response to the value determined by the comparison made by said fourth means and its significant proportional and rate response to the value determined by the comparison made by said fifth means.

* * * * *